(No Model.) 2 Sheets—Sheet 1.
P. J. GARBER.
CORN HARVESTER.
No. 471,475. Patented Mar. 22, 1892.
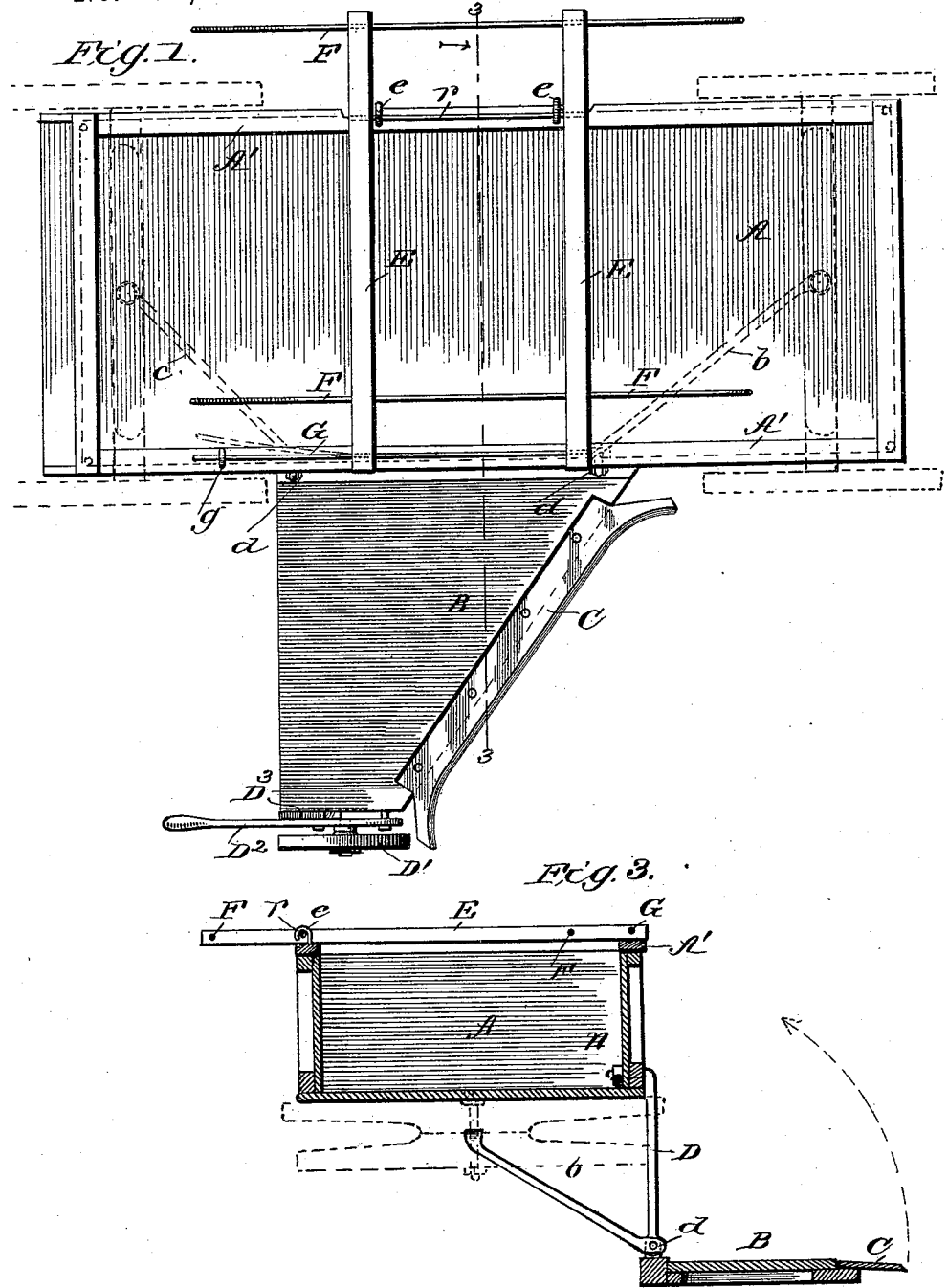
WITNESSES:
Fred G. Dieterich
Edw. H. Byrn
INVENTOR:
Peter J. Garber
BY
ATTORNEYS (No Model.) 2 Sheets—Sheet 2.
P. J. GARBER.
CORN HARVESTER.
No. 471,475. Patented Mar. 22, 1892.
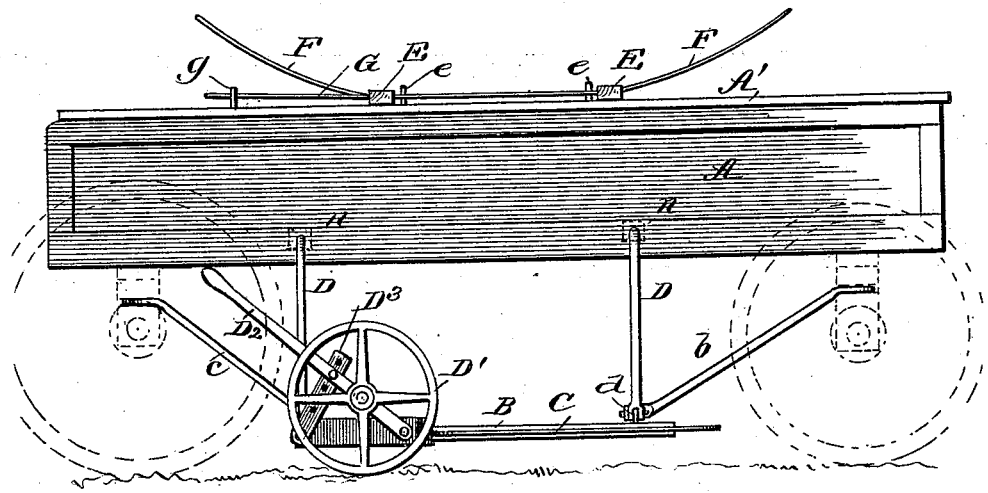
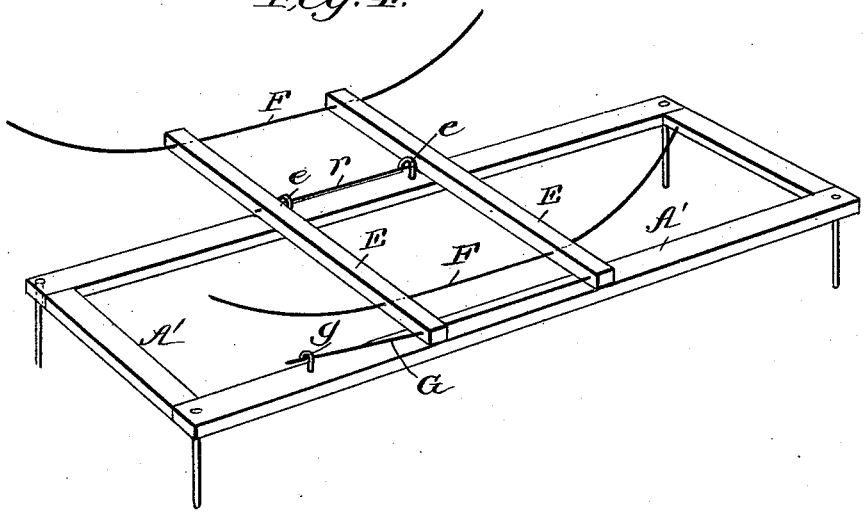
WITNESSES:
Fred G. Dieterich
Edw. W. Byrn
INVENTOR:
Peter J. Garber
BY Munn & Co.
ATTORNEYS

UNITED STATES PATENT OFFICE.

PETER J. GARBER, OF POTWIN, KANSAS.

CORN-HARVESTER.

SPECIFICATION forming part of Letters Patent No. 471,475, dated March 22, 1892.

Application filed December 24, 1891. Serial No. 416,055. (No model.)

*To all whom it may concern:*

Be it known that I, PETER J. GARBER, of Potwin, in the county of Butler and State of Kansas, have invented a new and useful Improvement in Corn-Harvesters, of which the following is a specification.

My invention relates to that form of corn-harvester in which the cutter is in the nature of a detachable knife applied to the side of the frame of an ordinary farm-wagon; and it consists in the peculiar construction of the knife and the means for connecting it to the wagon-frame, and also in a carrier or shocker for the cornstalks, which serves to receive the cornstalks and transport them to the side of the field, as will be hereinafter fully described.

Figure 1 is a plan view of the devices applied to a wagon-body. Fig. 2 is a side elevation of the same. Fig. 3 is a vertical transverse section through line 3 3 of Fig. 1, and Fig. 4 is a perspective view of the carrier or shocker.

In the drawings, A represents the rectangular frame-work of a farm-wagon. To the side of this is secured by nut $n$ two vertical hanger-bars D D, the upper ends of the hanger-bars being bent at right angles and then extended through holes in the side bars and secured therein by nuts $n$ on the inside. These hanger-bars extend downwardly to a point near the ground, and to their lower ends is hinged at $d$ a platform B, of a somewhat triangular shape. The forward edge of this platform is arranged obliquely to the line of draft and is provided with an inclined knife C, whose ends are bent forwardly to catch and hold the cornstalks, so that they do not slip off the knife without being cut.

The platform B is sustained upon its inner side by the hinges, which connect it to the hanger-bars, and at its outer end it is sustained by a running-wheel D', journaled upon a lever $D^2$, which is fulcrumed to the platform and is adjusted by means of a perforated bar $D^3$ and a bolt, so that the outer end of the platform may be adjusted higher or lower, as may be required. To carry the strain of the cutting action, the platform is connected to the wagon-frame by bars or braces $b\ c$. These are connected to the hinges at the lower end of the hanger-bars, and the front one of these bars or braces $b$ is connected to the front king-bolt of the wagon, and the rear bar or brace $c$ is connected to a rear cross-bar of the wagon-frame.

Upon the wagon-frame A there is mounted another rectangular frame A', which is mounted upon and detachably fastened to the wagon-frame. This frame A' has hinged to it on one side, by means of the pintle-rod $r$ and hinge-eyes $e$, a shocker or carrier for receiving and holding the cornstalks and transporting them to the sides of the field. This shocker or carrier is composed of two cross-bars E E and two or more upwardly-curved arms F F, which latter are arranged longitudinally to the wagon-frame. To hold the shocker or carrier down against accidental tilting, a spring-bar G is attached to the shocker and is forced beneath and retained by a hook $g$ on the frame.

In practice the wagon is driven across the field with the knife C adjusted to a horizontal position and in line to catch against the row of cornstalks. In this position the stalks of corn are cut off by the knife as the wagon moves forward, and the workman standing upon the platform B seizes the stalks and places them upon the carrier E F until the end of the row is reached or a sufficient quantity has been gathered to form a shock. The stalks and fodder are then bound, and dumped by releasing the locking-bar G and tilting the carrier on its hinge. For transporting the cutter the platform is turned on its hinges into a vertical position.

The advantages of this corn-harvester are as follows: First, the knife being on the side, there is no danger of cutting the horses, as is liable to occur with other knives; second, the fodder is thrown on the carrier or shocker instead of being carried by hand to shocks, as others are, thereby saving all stops. It also carries all the fodder to the end of the field, so that there is no fodder on the land, leaving the land ready for the plow, and as the shocks are at the end of the field it prevents trampling down the land in wet weather. It also puts the fodder up in larger shocks, and the fodder therefore keeps better. It will also permit a larger quantity of corn to be cut per day and is much easier on the man. This is also a handy cutter for feeders, as they can cut their load and haul it into their stock, and thus save labor.

I am aware that it is not new to provide a wagon-frame with a hinged and obliquely-arranged knife arranged on the side, and I do not claim this broadly.

Having thus described my invention, what I claim as new is—

1. The combination, with the frame-work of a wagon, of the hanger-bars D D, the platform B, hinged to the lower end of the same and bearing an obliquely-arranged knife at its front edge, an adjustable running-wheel at the outer edge of the platform, and the fore-and-aft braces or bars $b$ $c$, connecting the hinges of the hanger-bars to the frame-work of the wagon, substantially as shown and described.

2. The combination, with the rectangular frame A', of the shocker or carrier composed of cross-bars E E and upwardly-curved arms F F, hinges for connecting the same to the frame-work, and the locking devices G $g$, substantially as shown and described.

PETER J. GARBER.

Witnesses:
J. W. MORRISON,
DANIEL BOYDEN.